(12) United States Patent
Borriello

(10) Patent No.: US 10,579,052 B2
(45) Date of Patent: Mar. 3, 2020

(54) OPERATING INDUSTRIAL PLANT MACHINES TO PREVENT COLLISIONS

(71) Applicant: SIEMENS AKTIENGESELLSCHAFT, Munich (DE)

(72) Inventor: Diego Borriello, Chiavari (IT)

(73) Assignee: Siemens Aktiengesellschaft, Munich (DE)

( * ) Notice: Subject to any disclaimer, the term of this patent is extended or adjusted under 35 U.S.C. 154(b) by 23 days.

(21) Appl. No.: 15/912,793

(22) Filed: Mar. 6, 2018

(65) Prior Publication Data

US 2018/0259943 A1    Sep. 13, 2018

(30) Foreign Application Priority Data

Mar. 7, 2017    (EP) .................................... 17159640

(51) Int. Cl.
*G05B 19/418*    (2006.01)
*G06Q 50/00*    (2012.01)

(52) U.S. Cl.
CPC ... *G05B 19/4188* (2013.01); *G05B 19/41865* (2013.01); *G06Q 50/00* (2013.01); *G05B 2219/31001* (2013.01); *G05B 2219/40339* (2013.01)

(58) Field of Classification Search
CPC .......... G05B 19/4188; G05B 19/41865; G05B 2219/40339; G05B 2219/31001; G06Q 50/00

USPC ......................................................... 700/282
See application file for complete search history.

(56) References Cited

U.S. PATENT DOCUMENTS

| | | | |
|---|---|---|---|
| 7,490,073 B1* | 2/2009 | Qureshi | G06F 11/079 706/50 |
| 2004/0111339 A1* | 6/2004 | Wehrung | G06Q 10/02 705/30 |
| 2014/0365258 A1* | 12/2014 | Vestal | G06Q 10/063114 705/7.15 |
| 2015/0105887 A1* | 4/2015 | Troy | G05B 19/41865 700/97 |
| 2016/0304281 A1 | 10/2016 | Elazary et al. | |
| 2017/0357250 A1* | 12/2017 | Sandler | G05B 19/41835 |

FOREIGN PATENT DOCUMENTS

GB          2528568 A       1/2016
WO     2013119942 A1       8/2013

* cited by examiner

*Primary Examiner* — Ziaul Karim
(74) *Attorney, Agent, or Firm* — Laurence Greenberg; Werner Stemer; Ralph Locher

(57) ABSTRACT

A method operates the machinery of a plant having various machines. The method includes providing software-readable information relative to working areas each relating to at least an operation of one of the machines. At least part of the machines are operated by MES or MOM software reading the information so as to avoid operations with overlapping working areas being performed at a same time.

8 Claims, 2 Drawing Sheets

OPERATING INDUSTRIAL PLANT MACHINES TO PREVENT COLLISIONS

CROSS-REFERENCE TO RELATED APPLICATION

This application claims the benefit, under 35 U.S.C. § 119, of European patent application EP 17159640.6 filed Mar. 7, 2017; the prior application is herewith incorporated by reference in its entirety.

BACKGROUND OF THE INVENTION

Field of the Invention

The invention relates to a method for operating machines preventing collisions between machinery of a plant, in particular a plant whose activities are managed by a MES or MOM system.

As defined by the Manufacturing Enterprise Solutions Association (MESA International), a manufacturing execution (MES) system or a manufacturing operations management (MOM) system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

The functions that MES/MOM systems usually include, in order to improve quality and process performance of manufacturing plants, are resource allocation and status, dispatching production orders, data collection/acquisition, quality management, maintenance management, performance analysis, operations/detail scheduling, document control, labour management, process management and product tracking.

For example, Siemens Corporation offers a broad range of MES/MOM products under its SIMATIC IT® product family.

MES/MOM software can be employed to manage the activities of an industrial plant, e.g. a manufacturing plant. According to an usual way to proceed an operator can start on the MES/MOM system operations prepared by an enterprise resource planning (ERP).

Many processes present, however, risks of machine collision, in particular those involving big size materials (e.g. airplane wings or ship hulls) and different equipment, which would be desirable to be operated at the same time, in order to save time and costs.

Currently, the most advanced machinery is provided with proximity sensors; besides that, the operators, according to their knowledge, can foresee which areas will be involved by each operation procedure.

This approach is, of course, prone to human error. When two moving parts operate too close, the sensors trigger a machine stop, causing the machines to return to their base location, needing to be restarted by the operator. It can be understood that this leads to frequent stops with loss of productivity.

Some software products can inform the operator, thanks to working area maps of the various machines, of possible conflicts. However, this does not allow to optimize the operation due to the fact that working times are not taken into account.

Therefore, it would be desirable to have a method not prone to human error which could maximize the opportunity to get the various machines of a plant to operate at the same time, thus optimizing the productivity of the plant.

SUMMARY OF THE INVENTION

The problems mentioned above have now been solved by a method for operating the machinery of a plant containing various machines. The method includes providing software-readable information relative to working areas each relating to at least an operation of one of the machines; and operating at least part of the machines by a MES or MOM software reading the information so as to avoid operations with overlapping working areas are performed at a same time.

The invention also relates to MES or MOM software capable of operating various machines of an industrial plant and reading information relative to working areas each relating to an operation of one of the machines, so as to avoid operations with overlapping working areas are performed at a same time.

An operation is a series of movement and or actions performed by the machine concerned. A "working area" is intended as a region of space where the machine can move or be present during the operation to which it relates. If an operation with partially or totally overlapping working areas is performed at the same time, a risk of collision is incurred.

A machine can be a single moving part or a series of parts or organs moving in a synchronized way, as appropriate.

According to an embodiment, instructions relating an operation are stored in a part program, i.e. a file that can be read by the MES/MOM software to perform the operation.

According to a preferred embodiment, the software is capable of individuating a working area by parsing the part program or by receiving metadata associated to the part program.

Other features which are considered as characteristic for the invention are set forth in the appended claims.

Although the invention is illustrated and described herein as embodied in operating industrial plant machines to prevent collisions, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
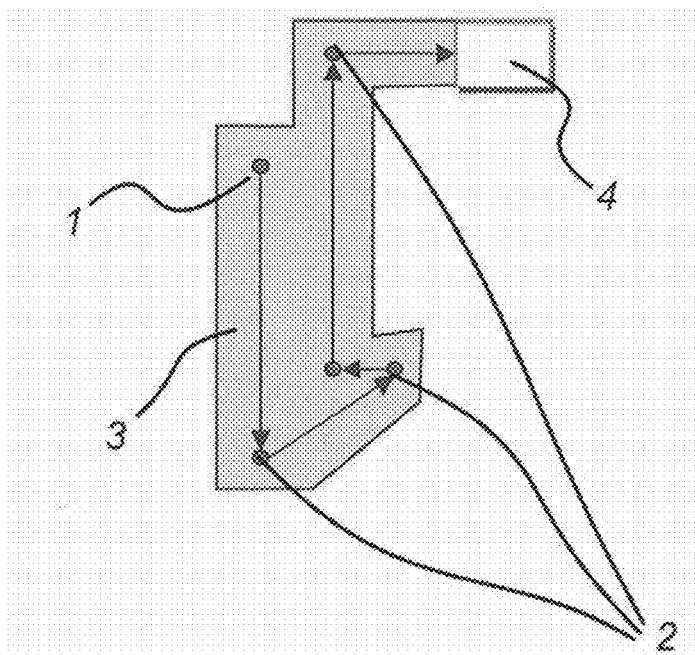
FIG. 1 is a schematic diagram showing a working area associated with an operation of a machine.

Referring now to the figures of the drawings in detail and first, particularly to FIG. 1 thereof, there is shown how an operation is performed and how a working area can be individuated.

The arrows correspond to movements of a machine from a starting point 1 to points 2 where the machine stops and performs a series of action (for example a drilling tool can move to various points where it performs borings on a piece) and, finally to an end location where the machine 4 is represented. The area 3 is the working area, and should not overlap with working areas of operations running at the same time.

Figure 2:
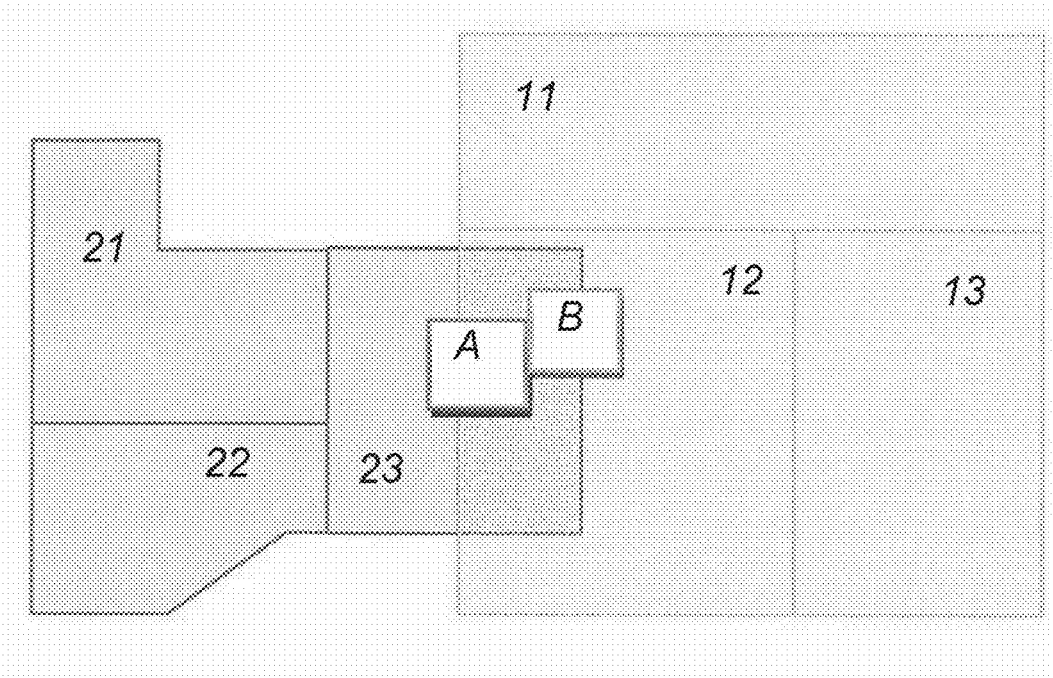
FIG. 2 is a schematic diagram showing working areas of operations comprised in work orders relating to two different machines.

With regard to FIG. 2, in a plant, the activities are can be divided in work orders composed of different operations, each operation being performed by the MES/MOM software by reading part programs.

To each part program is associated a working area.

As an example, a first work order contains three operations, to be performed by machine A in a determined sequence, respectively associated with working areas 21, 22 and 23, listed in the same order as the operations associated must be performed. A second work order with three operations to be performed by machine B, again in a determined sequence, respectively associated with working areas 11, 12 and 13, listed in the same order as the operations associated must be performed.

It is apparent that, if machine A executes the part program associated with area 23 and at the same time machine B is executing the part program 12, there is risk of collision or of a production stop due to the intervention of proximity sensors or any suitable security system.

According to the present invention, the MES/MOM software can, if, for example, the operation concerning area 12 is being performed by machine B, recognize the areas involved and avoid starting the operation associated with area 23 by machine A and perform a corrective action.

If a potential conflict is detected, according to an embodiment of the invention the software is able to perform at least one corrective action, such as warn the operator, stop the operation that can be in conflict and propose, or automatically perform another operation corresponding to another part program, if possible. It can possibly resume the stopped operation later. In the present example, it can simply delay operation associated with area 23.

Figure 3:
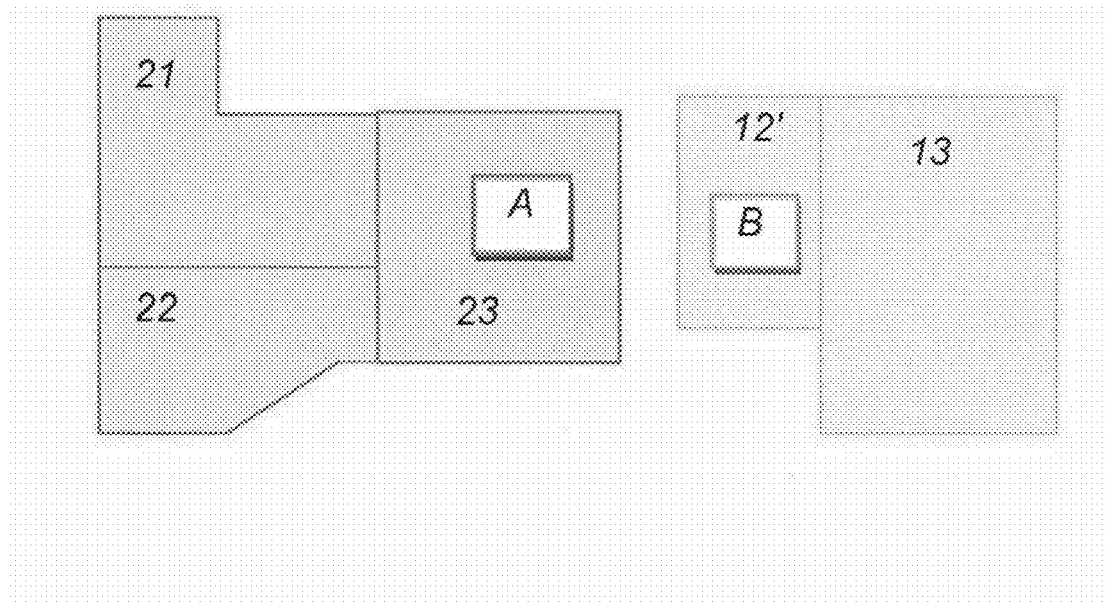
FIG. 3 is a schematic diagram showing working areas of FIG. 2 reduced at a time T1 after a part of a working order relating to one of the machines has been performed.

According to a further embodiment, the software can update the working area of a running operation according to its real run time, for example by receiving feed back information from the machine concerned. As shown in FIG. 3, if machine B has already performed an operation in area 11 and is performing an operation associate with area 12, the software can recognize that the area still needs to be involved at a certain instant but can be reduced to area 12' which does not overlap with area 23. Thus, the operation related to 23 can be started by machine A, without delay.

Figure 4:
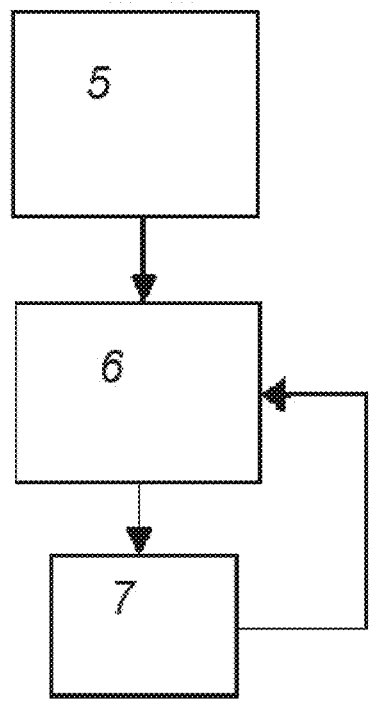
FIG. 4 is a schematic flow diagram relating to overall operation of the MES/MOM software.

The MES/MOM software can receive working orders from an operator, or, according to a preferred embodiment, directly from an ERP system, with which it can dialog. According to the flow diagram of FIG. 4, the ERP system 5 inputs work orders to the MES/MOM system 6. The software of the MES/MOM system can operate the machines 7 and receive feedback therefrom, in order to update the information about the working areas to be considered for preventing collision risks.

The following is a summary list of reference numerals and the corresponding structure used in the above description of the invention:
A, B Machines of an industrial plant
1 Starting point of operation of a machine
2 Points of action execution by a machine
3 Working area
4 Machine
5 ERP system
6 MES/MOM system running MES/MOM software
7 Machines
11, 12, 13 Working areas associated with operations to be performed by machine B
12' Updated working area associated with operations to be performed by machine B
21, 22, 23 Working areas associated with operations to be performed by machine A.

The invention claimed is:

1. A method for operating machinery of a plant having various machines, which comprises the steps of:
   storing software-readable information relating to working areas and each of the working areas relating to at least an operation of one of the machines, the machines being moved throughout the plant from one of the working areas to another of the working areas;
   operating at least part of the machines by manufacturing execution system (MES) or manufacturing operations management (MOM) software reading the software-readable information so as to avoid operations being performed at a same time within overlapping working areas;
   reading instructions relating to the operation by the MES or MOM software in a part program file, wherein the working areas are individuated by the MES or MOM software by parsing the part program file or by receiving metadata associated with the part program file;
   updating, via the MES or MOM software, a working area of a running operation according to its real run time, by receiving feedback information from a machine concerned;
   performing at least one corrective action, via the MES/MOM software, when the working area associated with an operation to be performed overlaps with a working area associated with an operation being performed, the at least one corrective action proposing another operation corresponding to another program part; and
   performing the operation by the machine on an object to be processed if no overlap occurred, where the object is stationed in the work area associated with the operation.

2. The method according to claim 1, wherein the corrective action includes warning an operator.

3. The method according to claim 1, wherein the corrective action includes stopping or delaying the operation whose associated working area overlaps with the working area associated with the operation being performed.

4. The method according to claim 1, which further comprises activating the MES or MOM software via enterprise resource planning (ERP) systems.

5. A non-transitory computer readable medium containing manufacturing execution system (MES) or manufacturing operations management (MOM) software having computer executable instructions capable of operating various machines of an industrial plant for performing the method step of:
   reading information relative to working areas each relating to an operation of one of the machines, so as to avoid operations being performed at a same time within overlapping working areas, the machines being moved throughout the industrial plant from one of the working areas to another of the working areas;
   reading instructions relating to the operation by the MES or MOM software in a part program file, wherein the working areas are individuated by the MES or MOM software by parsing the part program file or by receiving metadata associated with the part program file;

updating a working area of a running operation according to its real run time, by receiving feedback information from a machine concerned;

performing at least one corrective action when the working area associated with an operation to be performed overlaps with a working area associated with an operation being performed, the at least one corrective action proposing another operation corresponding to another part program; and performing the operation by the machine concerned on an object to be processed if no overlap occurred, where the object is stationed in the work area associated with the operation.

6. The non-transitory computer readable medium according to claim 5, wherein the corrective action includes warning an operator.

7. The non-transitory computer readable medium according to claim 5, wherein the corrective action includes stopping or delaying the operation whose associated working area overlaps with the working area associated with the operation being performed.

8. The non-transitory computer readable medium according to claim 5, which further comprises activating the MES or MOM software via enterprise resource planning (ERP) systems.

* * * * *